United States Patent
Feng

(10) Patent No.: US 9,377,073 B2
(45) Date of Patent: Jun. 28, 2016

(54) FLEXIBLE SUPPORT SHAFT

(75) Inventor: Zhaoping Feng, Chengdu (CN)

(73) Assignee: CHENGDU YOUYANG ELECTROMECHANICAL PRODUCT DESIGN CO., LTD, Chengdu (CN)

( * ) Notice: Subject to any disclaimer, the term of this patent is extended or adjusted under 35 U.S.C. 154(b) by 30 days.

(21) Appl. No.: 14/372,966

(22) PCT Filed: Jan. 20, 2012

(86) PCT No.: PCT/CN2012/070647
§ 371 (c)(1),
(2), (4) Date: Oct. 15, 2014

(87) PCT Pub. No.: WO2013/107034
PCT Pub. Date: Jul. 25, 2013

(65) Prior Publication Data
US 2015/0076754 A1  Mar. 19, 2015

(51) Int. Cl.
*F16M 1/00* (2006.01)
*F16F 3/12* (2006.01)

(52) U.S. Cl.
CPC ..................... *F16F 3/12* (2013.01)

(58) Field of Classification Search
CPC .............. F16F 3/12; F16F 3/10; F16F 3/093; F16F 15/10; F16F 15/12
USPC ........ 267/140.4, 141, 141.2, 141.4, 136, 178, 267/70, 33
See application file for complete search history.

(56) References Cited

U.S. PATENT DOCUMENTS

| 4,731,966 A | * | 3/1988 | Fujita | E04B 1/98 248/618 |
| 4,854,556 A | * | 8/1989 | Pietrzak | F16F 7/14 248/570 |
| 4,874,154 A | * | 10/1989 | Zimbone | F16F 3/12 267/140.4 |
| RE33,696 E | * | 9/1991 | Stevenson | |

FOREIGN PATENT DOCUMENTS

| CN | 200981588 | 11/2007 |
| CN | 201483254 | 5/2010 |
| CN | 101913051 | 12/2010 |
| DE | 102009022810 | 12/2010 |
| JP | 2007-309361 | 11/2007 |

* cited by examiner

*Primary Examiner* — Pamela Rodriguez
(74) *Attorney, Agent, or Firm* — Hamre, Schumann, Mueller & Larson, P.C.

(57) ABSTRACT

A flexible support shaft (10) configured to be arranged on a first object to flexibly support a second object moving relative to the first object is provided. The flexible support shaft comprises a first connecting flange (20) for being mounted on the first object, a compression spring (30) having one end arranged on the first connecting flange, an elastic member (40) configured to be embedded by the compression spring to change the elasticity of the compression spring, and a second connecting flange (50) arranged on the other end of the compression spring to support the second object. Because of the design of the compression spring and the elastic member thereon, the flexible support shaft acts not only as a support but also as a shock absorber for the second object in relative motion. Furthermore, since the compression spring is embedded in the elastic member, the elastic member changes the elasticity and rigidity of the compression spring.

9 Claims, 3 Drawing Sheets

FLEXIBLE SUPPORT SHAFT

TECHNICAL FIELD

The present invention relates to support shafts, in particular, to a flexible support shaft.

BACKGROUND

In industrial production, it may often meet the situation that a motion object moves relative to a fixed object, and the motion object is supported by the fixed object through a support shaft. An existing support shaft only plays a supporting role, and there is insufficient attention to the shock to the support shaft from the motion object and to the fixed object from the motion object through the support shaft, which may cause the damage of the support shaft and the fixed object. Therefore, the present invention needs to improve the support shaft.

SUMMARY

The present invention aims at providing a flexible support shaft, to solve the problem that the support shaft in the prior art only plays a supporting role and insufficient attention is paid to shock absorption.

The embodiment of the present invention is implemented by a flexible support shaft configured to be arranged on a first object to flexibly support a second object moving relative to the first object, wherein the flexible support shaft comprises a first connecting flange for being mounted on the first object, a compression spring having one end arranged on the first connecting flange, an elastic member configured to be embedded by the compression spring to change the elasticity of the compression spring, and a second connecting flange arranged on the other end of the compression spring to support the second object.

Because of the design of the compression spring and the elastic member thereon, the flexible support shaft acts not only as a support but also as a shock absorber for the second object in relative motion. Furthermore, since the compression spring is embedded in the elastic member, the elastic member changes the elasticity and rigidity of the compression spring.

DETAILED DESCRIPTION

To make the objectives, technical solutions and advantages of the present invention be clearer, the present invention will be further described hereinafter with reference to the accompany drawings and embodiments. It shall be understood that, the embodiments described herein are only intended to illustrate but not to limit the present invention.

Figure 1:
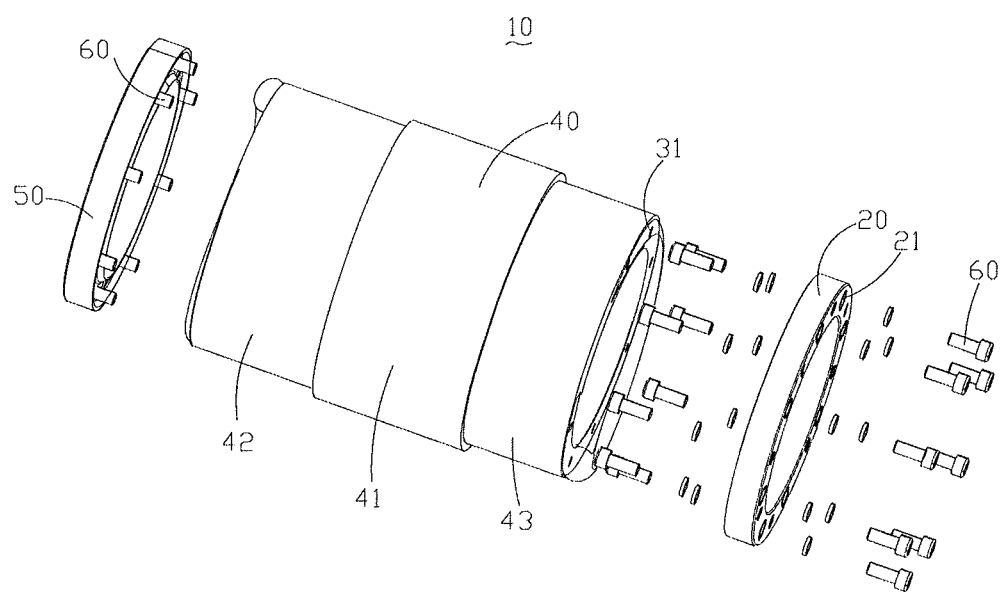
FIG. 1 is a three-dimensional exploded view of a flexible support shaft according to an embodiment of the present invention.
Figure 2:
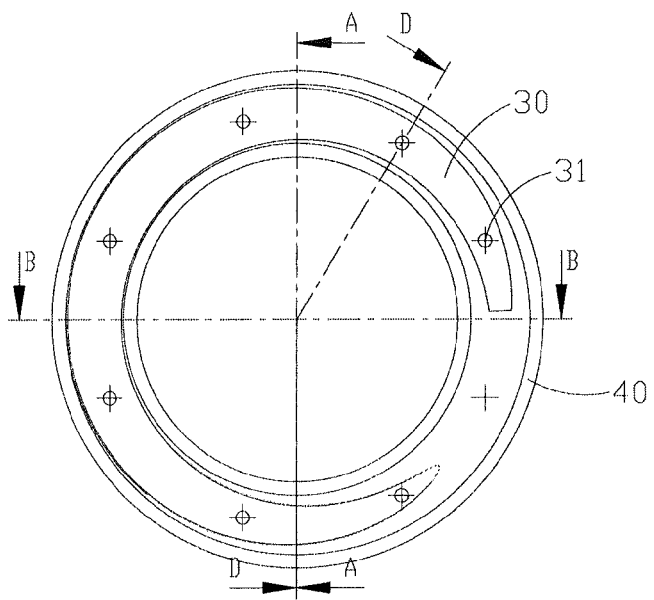
FIG. 2 is an end face view of the flexible support shaft in FIG. 1.
Figure 3:
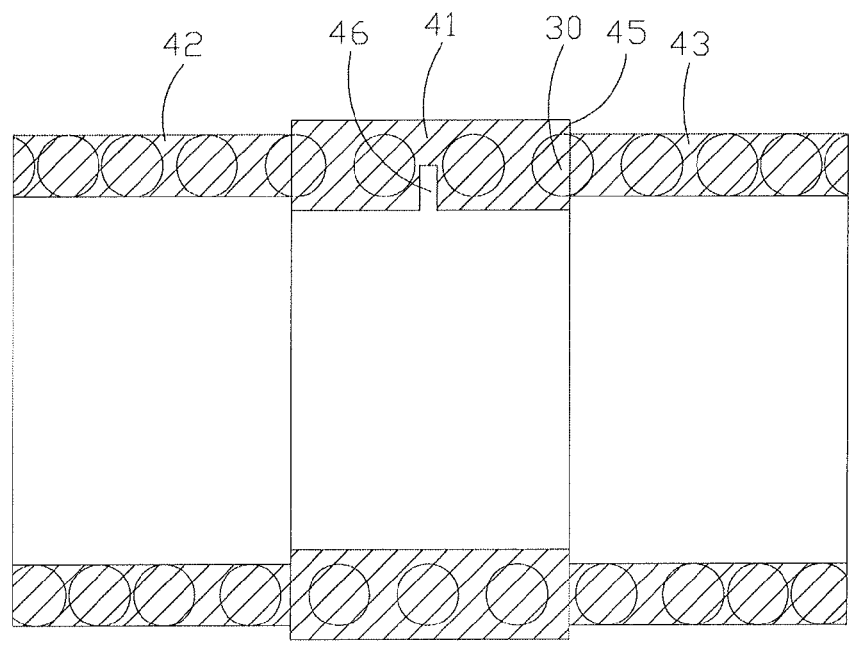
FIG. 3 is a cross-section view of the flexible support shaft in FIG. 2, along the A-A line.
Figure 4:
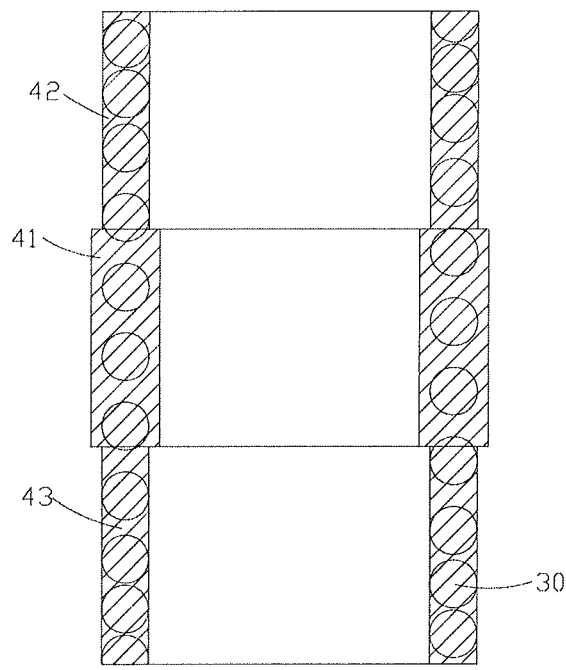
FIG. 4 is a cross-section view of the flexible support shaft in FIG. 2, along the B-B line.
Figure 5:
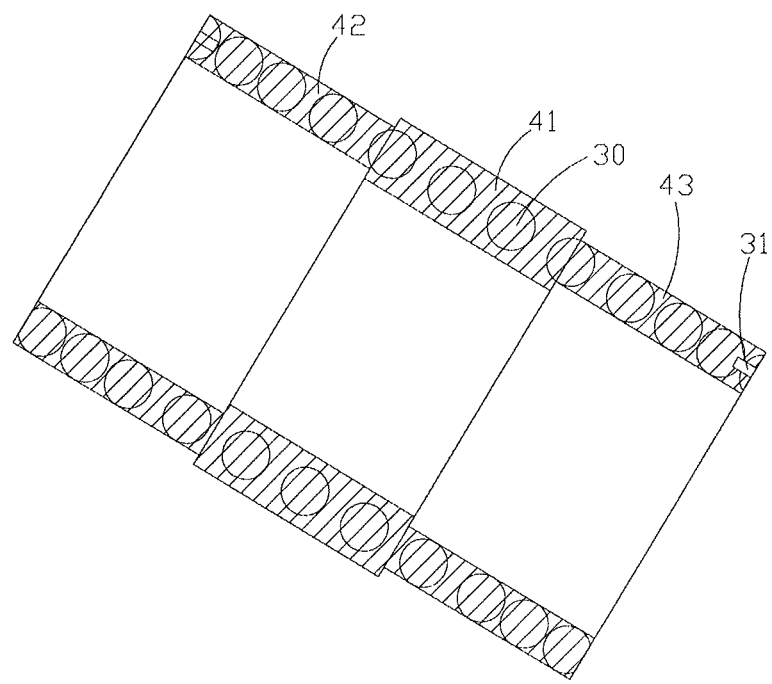
FIG. 5 is a cross-section view of the flexible support shaft in FIG. 2, along the D-D line.

Referring to FIG. 1 to FIG. 5, a flexible support shaft 10 provided by the present invention is configured to be arranged on a first object (not shown) to flexibly support a second object (not shown) moving relative to the first object. The flexible support shaft 10 comprises a first connecting flange 20 for being mounted on the first object, a compression spring 30 having one end mounted on the first connecting flange 20, an elastic member 40 configured to be embedded by the compression spring 30 to change the elasticity of the compression spring 30, and a second connecting flange 50 mounted on the other end of the compression spring 30 to support the second object. The elastic member 40 and the compression spring 30 are formed integrally.

The compression spring 30 is a cylinder formed by winding a spring wire, and a cross section of the spring wire is a circle. The compression spring 30 defines a plurality of mounting holes 31 arranged along an axis of the compression spring 30 on the spring wire at two opposite ends of the compression spring 30. The distribution of the distances between every two adjacent spring wire circles of the compression spring 30 is a close-sparse-close arrangement from the center of the compression spring 30 to two opposite ends of the compression spring 30. The distribution of the distances between every two adjacent spring wire circles of the compression spring 30 can be adjusted, so that the elasticity and rigidity of the flexible support shaft 10 are adjusted.

The first connecting flange 20 is circular disc ring shaped. The first connecting flange 20 is provided with a plurality of first fixing holes 21, The second connecting flange 50 is circular disc ring shaped. The second connecting flange 50 is provided with a plurality of second fixing holes (not shown). The first fixing holes 21 and the second fixing holes are corresponding to the mounting holes 31. Locking members 60, such as screws, pass through the first fixing holes 21 and are screwed and locked with corresponding mounting holes 31, such that the first connecting flange 20 is fixed onto the compression spring 30. The locking members 60 pass through the second fixing hole and are screwed and locked with corresponding mounting holes 31, such that the second connecting flange 50 is fixed onto the compression spring 30.

A cross section of the elastic member 40 is a torus. The elastic member 40 comprises a middle section 41 arranged in the middle of the compression spring 30 and a first section 42 and a second section 43 respectively arranged on two opposite ends of the middle section 41. The thicknesses of the first section 42 and the second section 43 are less than the thickness of the middle section 41. An outer surface of the middle section 41 protrudes beyond outer surfaces of the first section 42 and the second section 43 to form a water retaining ring 45.

In practical use, the elasticity of the flexible support shaft 10 may be adjusted according to the requirement by adjusting the volume of the middle section 41 of the elastic member 40. For example, in this embodiment, the outer surface and/or an inner surface of the middle section 41 of the elastic member 40 is dug with a recess 46 which doesn't penetrate the middle section 41, such that the volume of the middle section 41 of the elastic member 40 is changed, and the elasticity of the middle section 41 is thereby changed. The form of the recess 46 may be varied, for example, in a blind hole manner.

The elastic member 40 and the compression spring 30 are formed through injection molding, extrusion molding, or casting molding.

Because of the design of the compression spring 30 and the elastic member 40 thereon, the flexible support shaft 10 acts not only as a support but also as a shock absorber for the second object in relative motion. Furthermore, since the compression spring 30 is embedded in the elastic member 40, the elastic member 40 changes the elasticity and rigidity of the compression spring 30.

In the present invention, the bearing capacity and deformation of the flexible support shaft 10 are set by changing each parameter of the compression spring 30, and the elasticity and rigidity of the flexible support shaft 10 can be adjusted by changing the chemical composition, geometry size, and distribution status of the elastic member 40.

What described above are only preferred embodiments of the present disclosure but are not intended to limit the scope of the present disclosure, any modifications, equivalent replacements and improvements etc. made within the spirit and principle of the present invention, should be included in the protection scope of the present invention.

What is claimed is:

1. A flexible support shaft, configured to be arranged on a first object to flexibly support a second object moving relative to the first object, wherein the flexible support shaft comprises:
   a first connecting flange mounted on the first object;
   a compression spring having a first end arranged on the first connecting flange;
   an elastic member embedded by the compression spring to change the elasticity of the compression spring, wherein a cross section of the elastic member is a torus, the elastic member comprises a middle section arranged in a middle of the compression spring and a first section,
   a second connecting flange arranged on a second end of the compression spring to support the second object; and
   a second section respectively arranged on two opposite ends of the middle section, and the thickness of the first section and the second section are less than the thickness of the middle section.

2. The flexible support shaft of claim 1, wherein the compression spring is a cylinder formed by winding a spring wire, and a cross section of the spring wire is a circle.

3. The flexible support shaft of claim 2, wherein the distribution of the distances between two adjacent spring wire circles of the compression spring is a close-sparse-close arrangement from the center of the compression spring to two opposite ends of the compression spring.

4. The flexible support shaft of claim 2, wherein the compression spring defines a plurality of mounting holes arranged along an axis of the compression spring on the spring wire at two opposite ends of the compression spring, the first connecting flange is provided with a plurality of first fixing holes, the second connecting flange is provided with a plurality of second fixing holes, and the first fixing holes and the second fixing holes correspond to the plurality of mounting holes.

5. The flexible support shaft of claim 1, wherein an outer surface of the middle section protrudes beyond outer surfaces of the first section and the second section to form a water retaining ring.

6. The flexible support shaft of claim 1, wherein the outer surface and/or an inner surface of the middle section of the elastic member is dug with a recess which does not penetrate the middle section.

7. The flexible support shaft of claim 1, wherein the elastic member and the compression spring are formed integrally.

8. The flexible support shaft of claim 7, wherein the elastic member and the compression spring are formed through injection molding, extrusion molding, or casting molding.

9. A flexible support shaft, configured to be arranged on a first object to flexibly support a second object moving relative to the first object, wherein the flexible support shaft comprises:
   a first connecting flange for being mounted on the first object;
   a compression spring having a first end arranged on the first connecting flange;
   an elastic member embedded by the compression spring to change the elasticity of the compression spring; and
   a second connecting flange arranged on a second end of the compression spring to support the second object, wherein the compression spring is a cylinder formed by winding a spring wire, and a cross section of the spring wire is a circle,
   wherein the compression spring defines a plurality of mounting holes arranged along an axis of the compression spring on the spring wire at two opposite ends of the compression spring, and the first connecting flange includes a plurality of first fixing holes, the second connecting flange includes a plurality of second fixing holes, and the first fixing holes and the second fixing holes correspond to the plurality of mounting holes.

* * * * *